United States Patent
Brown (10) Patent No.: US 7,032,946 B1
(45) Date of Patent: Apr. 25, 2006

(54) BARRIER SHIELD FOR A BUS

(76) Inventor: Thomas C. Brown, 1412 Pawnee Trail, Carrollton, TX (US) 75007

( * ) Notice: Subject to any disclaimer, the term of this patent is extended or adjusted under 35 U.S.C. 154(b) by 0 days.

(21) Appl. No.: 10/980,070

(22) Filed: Nov. 3, 2004

Related U.S. Application Data (60) Provisional application No. 60/525,789, filed on Nov. 29, 2003.

(51) Int. Cl.
 B60N 3/00 (2006.01)
 E06B 3/68 (2006.01)
(52) U.S. Cl. ............... 296/24.4; 49/54; 280/749
(58) Field of Classification Search ........... 296/24.4, 296/24.42, 24.46, 152; 49/38, 54; 454/211, 454/212; 109/9, 49.5; 280/749
See application file for complete search history.

(56) References Cited

U.S. PATENT DOCUMENTS

| | | | |
|---|---|---|---|
| 1,868,093 A * | 7/1932 | Clapp | 296/24.46 |
| 3,659,516 A * | 5/1972 | MacDonald | 454/133 |
| 4,227,735 A | 10/1980 | Joyner | |
| 4,546,693 A * | 10/1985 | McTaw, Jr. | 454/128 |
| 4,700,614 A * | 10/1987 | Dudzik | 454/213 |
| 5,004,286 A | 4/1991 | Taylor, III et al. | |
| 5,080,425 A * | 1/1992 | Austin | 296/152 |
| 5,647,629 A | 7/1997 | Collins | |
| 6,012,753 A * | 1/2000 | Ordoyne et al. | 296/24.31 |

* cited by examiner

Primary Examiner—Dennis H. Pedder (57) ABSTRACT

The present invention is a barrier shield having selective transparent areas therein that incorporates particular optical glare and reflection reduction methods utilizing diffractive and grating techniques within a tilted planar surface having selective openings therethrough. This barrier shield is mounted within the closure door for correcting the transmissive optical imagery enabling the driver/operator to view the passengers through the closure door barrier shield using, typically, the inside rear-view mirror without compromise to safety or security.

24 Claims, 9 Drawing Sheets

BARRIER SHIELD FOR A BUS

CROSS-REFERENCE TO RELATED APPLICATIONS

This patent application incorporates by reference provisional patent application 60/525,789, filed Nov. 29, 2003, titled "Anti Glare Passenger Bus Barrier Shield" and this is the regular utility patent application of this provisional patent application.

BACKGROUND OF THE INVENTION

1. Field of the Invention

The present invention relates to passenger buses and the like, and, in particular, relates to devices to prevent passengers from interfering with the driver, and, in greater particularity, relates to doors that act as a barrier shield to the passenger area of the bus, as drivers now face heightened security issues.

2. Description of the Prior Art

Intercity passenger buses may be used to transport passengers from point to point such as Greyhound buses. Similar buses may also be used in mass transit operations within a metropolitan area. In any event, the bus driver is normally preoccupied with driving the bus and thus may be unaware of passengers attempting to assault the bus driver, take over the bus or attempting to crash the bus until it is too late to prevent direct contact and is thus unable to defend himself/herself without possibly crashing the bus because of the interference from the attacking passenger(s). If the passenger bus is a mass transit bus, a passenger may be attempting to rob the driver of collected fares also.

Buses are typically operated during all times of the day, but night time operations creates special problems for the driver. The driver is confronted with glaring lights and reflections from lights, from vehicles in the rear and those approaching, so it is difficult for the driver to monitor the passenger area by looking in the inside rear-view mirror. Interior lights also create glare and reflections as well as sun light during the day time.

Several issued patents are directed at devices for protecting the driver from attacking passengers.

U.S. Pat. No. 4,227,735 issued on Oct. 14, 1980 and entitled "Protective Enclosure for a Bus" discloses an enclosure about the driver of a typical mass transit bus. The driver's location is surrounded by a rear wall with transparent windows therein and a side wall also with transparent windows therein. A fare collecting device may be attached to the side wall. The side wall also contains a locking door with transparent windows therein. Although glass may be one type of transparent material there are other types of materials that will present an impenetrable transparent window such as clear polycarbonate materials. The windows in this patent are vertical and thus would not provide the driver with glare and reflection prevention.

U.S. Pat. No. 5,004,286 issued on Apr. 2, 1991 and entitled "Transport Vehicle Protective Shield" discloses a compartment for the bus driver having transparent, multi-layered, bullet-proof paneling. All of the paneling is vertically oriented and thus would present glare and reflections to the driver.

U.S. Pat. No. 5,647,629 issued Jul. 15, 1997 and entitled "Reflection Eliminator" discloses a structure having a plurality of vertically oriented members. The device is typically placed on the dash, for example, and prevents sun light from being reflected off of the dash onto the sloping window and then into the eyes of the driver. The use of this device to prevent glare and reflections from vertical windows such as in the enclosure/compartment shown above is not feasible.

Even when there is a security isolation booth structure as disclosed in the first two patents, the driver/operator of a bus has difficulty viewing passengers while using the inside rear-view mirror. A closure door may be designed to open and latch against a panel installed on the right side of the aisle while the bus is in operation. In order for the driver to see the passenger area through the closure door, typically, a transparent vertical insert is placed in the closure door. The driver/operator is unable to observe or observe with great difficulty the passengers while using the inside rear-view mirror because of daytime and nighttime optical glare and reflection projected off the flat vertical insert of the closure door thus posing a safety and security dilemma.

Further anti-glare and anti-reflection techniques, both required in the present invention, such as screens, films, coatings, and surface-changing processes are more limited to particular surfaces and images. The desired image is usually in near proximity to the surface of glare and reflection in order for any of the above techniques to be successful, as opposed to desired images of a distant proximity from a surface of glare and reflection because of the dispersion of light rays versus the transmission of light rays. The need to view distant images through a surface of glare and reflection created a situation where existing methods could not achieve their intended purpose.

Thus, there exists a need for bus driver barrier shield that allows the bus driver to protect himself/herself from attack while at the same time allows the viewing of the passenger area by an inside rear-view mirror or directly by substantially reducing or eliminating the glare and reflections from the barrier shield itself.

BRIEF SUMMARY OF THE INVENTION

The present invention provides a driver/operator with an isolation enclosed structure built within the bus for driver security. A barrier shield is specifically installed within a frame of a closure door so as to maintain the integrity of the security surround and reduce or eliminate optical glare and reflection.

The present invention is a barrier shield having selective transparent areas therein that incorporates particular optical glare and reflection reduction methods utilizing diffractive and grating techniques within a slanted insert having selective openings therethrough. This barrier shield is mounted within the closure door for correcting the transmissive optical imagery enabling the driver/operator to view the passengers through the closure door barrier shield using, typically, the inside rear-view mirror without compromise to safety or security.

The barrier shield for use in multiple passenger vehicles like buses is installed in the closure door located adjacent the driver of the bus. The barrier shield may be rotated to block the passenger isle of the bus. The barrier shield has an apertured area having one or more predetermined openings therein for increased visibility. These opening may be horizontal slots or other types of openings. The apertured area is a part of a high visibility insert which has a slant ranging from zero degrees to about 10 degrees, preferably about 6 degrees. The high visibility insert is composed of a transparent material, preferably polycarbonate. The high visibility insert may be a part of a back panel. The back panel being composed a substantially flat transparent material and having the apertured area and the high visibility insert therein is mounted in the closure door.

One objective of the present invention is to provide a barrier shield that allows the driver/operator increased visibility of the passengers without compromising safety, security, or the design of the driver's isolation enclosure structure.

Another object of the present invention is to provide for a transparent glare-reducing shield for installation in a passenger bus with little or no modification to the isolation booth or its closure door.

Another object of the present invention is to provide for a barrier shield having similar transparent materials as materials used in other parts of the isolation booth to achieve anti-glare and anti-reflection qualities.

A further object of the present invention is to provide a barrier shield of a decorative design to reduce or eliminate the fears and anxieties of the passengers who further will be looking through the barrier shield in the direction of travel of the bus.

These and many other objects, features and advantages of the present invention will be readily apparent to one skilled in the pertinent art from the following detailed description of a preferred embodiment of the invention and the related drawings.

DETAILED DESCRIPTION OF THE INVENTION

Figure 1:
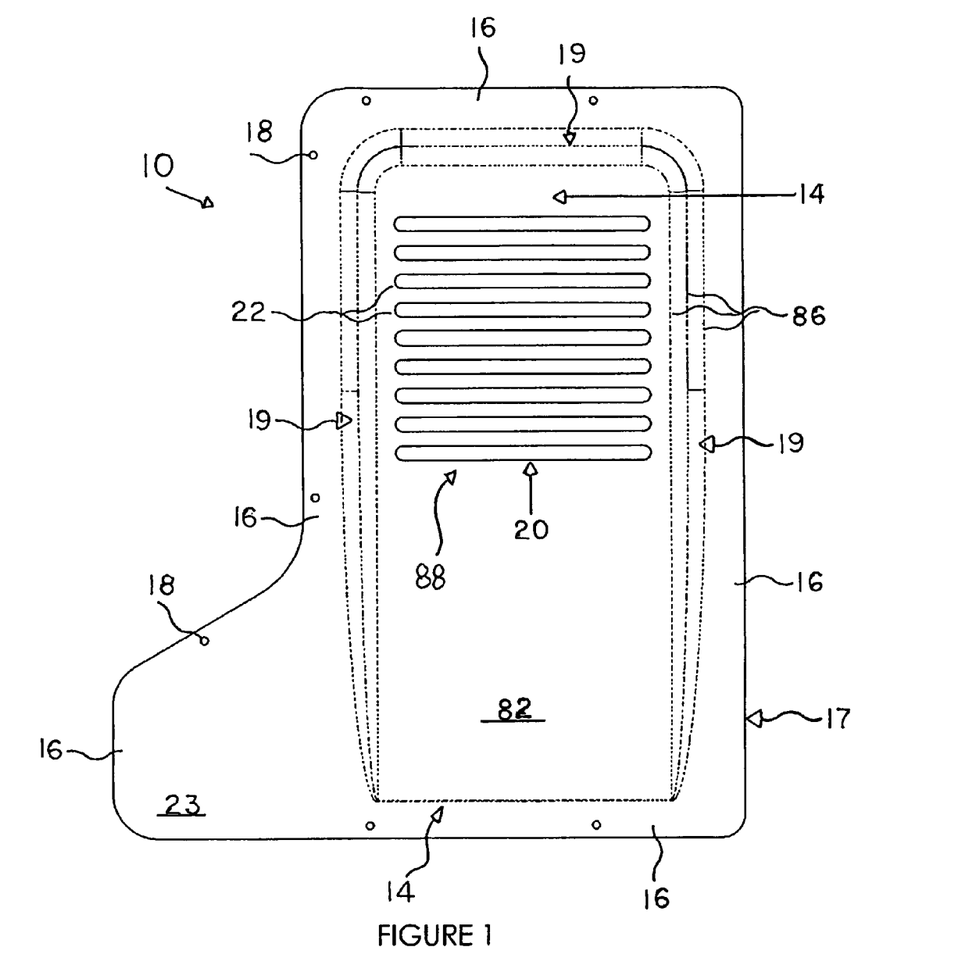
FIG. 1 is front elevational view of the barrier shield of the present invention.
Figure 2:
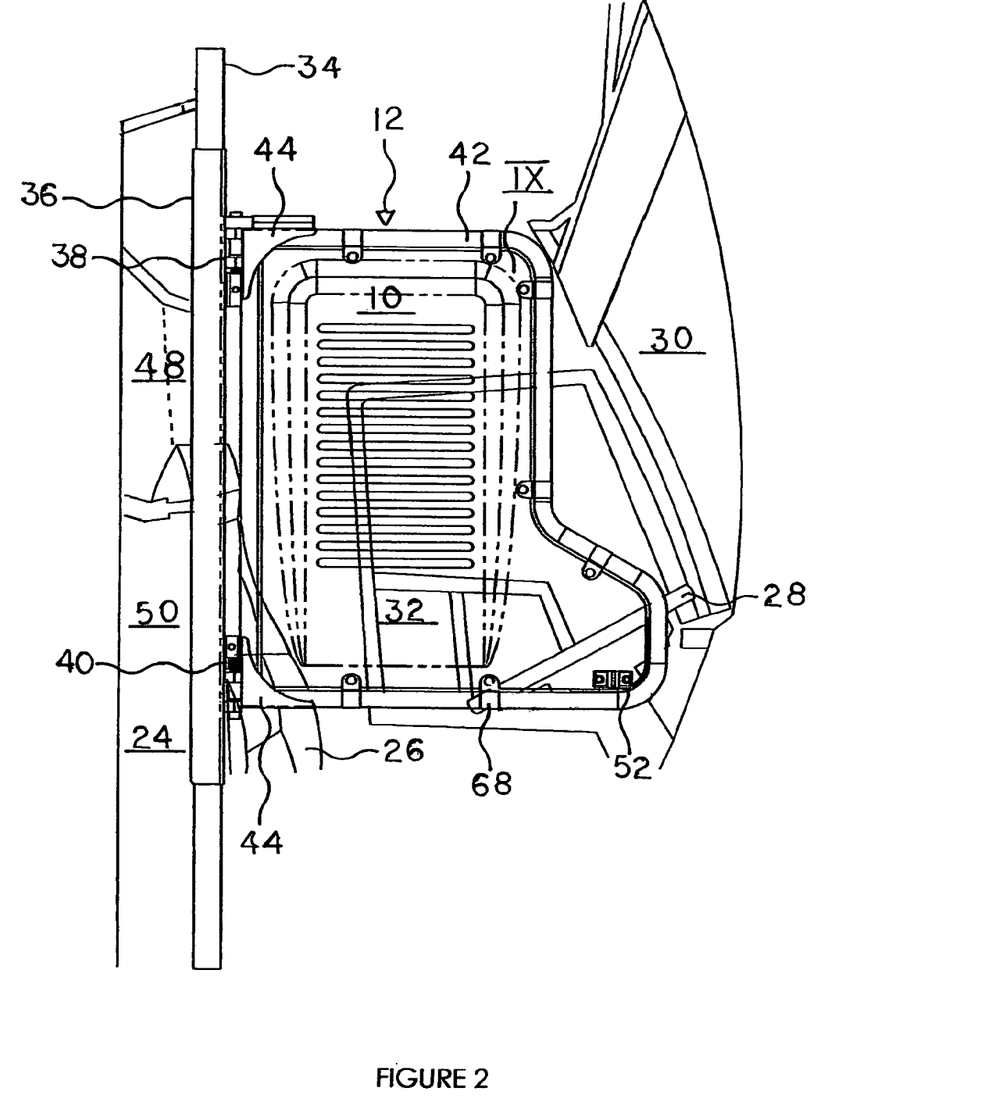
FIG. 2 is a front elevational view of the barrier shield of the present invention installed in an enclosure door frame, a closure door being in the open position about the driver's position on a conventional bus, only partially shown.

Referring to FIG. 1, a barrier shield 10 is shown by a front elevational view removed from a closure door 12 of FIG. 2. As seen in FIG. 1, the preferred embodiment of the present invention is an integrally formed transparent plastic barrier shield 10. The barrier shield 10 comprises a slanted high visibility insert 14 with an apertured area 88 having at least one or more openings therein with predetermined shapes such as a grate area with a plurality of horizontal slots therein such as shown in the FIG. 3, for example. Attachment means 18 such as bolt holes are positioned about mounting flanges 16 to be discussed below. A latch mounting area 23 being an extended panel section is positioned on the bottom of the barrier shield 10. The slanted high visibility insert 14 has a plurality of predetermined openings 20 as seen in FIG. 1, approximately 8 to 15 horizontal viewing ports or slots 22 which span the width of the slanted high visibility insert 14. As seen in FIG. 1, the dashed lines 86 indicate bend lines in a panel 17 in which attaching walls 19 are formed between the flanges 16 and the slanted high visibility insert 14 as to be further detailed herein.

The operating environment of the barrier shield 10 in the closure door 12 is clearly shown in FIG. 2. As seen therein, the closure door 12 is in the open condition, blocking entrance to a driver seat.

As seen in FIG. 1, the barrier shield 10 is made from one piece of molded thermoforming plastic such as a polycarbonate material. As seen therein, all edges, corners, and junctions of walls are rounded in the molding process to present a professional appearance as well as providing non-cutting edges to passengers including especially child who pass by the opened closure door 12 as seen in FIG. 2. The slots 22 may be formed as an integral part of the molding process or formed in a router process. Although the preferred material is polycarbonate, other materials may be used which are acceptable in the manufacturing process as well as compatible with other viewing areas near the driver isolation enclosure structure 24, only partial seen in FIG. 2. Glass may be considered but it is more difficult to form into the shapes shown and would be a heavier, more expensive material. Considering the proximity of the barrier shield 10 to passengers, the surfaces must be easily cleaned and resistant to scratches, cuts, chips, etc. Further, the material must be sufficiently thick and strong to prevent breakage from accidental hits from luggage and other carry-on objects. Polycarbonate is an ideal material in that it is very strong and shatter proof in the present environment and conforms with regulatory standards.

The barrier shield 10 as shown is totally composed of a clear transparent material. Although parts of the barrier shield 10 may be partially colored or of a solid color, the preferred color is clear water. The preferred barrier shield 10 is integrally formed of plastic material, but the barrier shield 10 may be made of separate parts secured together to form a similar structure. Having the barrier shield 10 made of a clear material presents to the passengers a less threatening structure and a more open structure so that they can clearly see the bus driver and see in the direction of the bus travel as compared to a solid door with only the clear insert therein.

The barrier shield 10 may be constructed of various pieces of plastic material so that when glued or otherwise secured to the other pieces, the joints will be squared off and the edges will be sharp. This would further require rounding of the sharp angular edges and an increase in the manufacturing costs.

As seen in FIG. 2, the barrier shield 10 is mounted to a closure door frame 42. As a preferred material, the door frame 42 is made from stainless steel tubing so as to present a professional appearance and a relatively maintenance free material. The only welded joints in the door frame 42 are covered by corner caps 44 which simultaneously provide a mounting surface for the upper and lower hinges 38 and 40, respectively.

The barrier shield 10 may be mounted to the door frame 42 by various techniques. Referring to FIG. 2, mounting channels could be attached to the inside of the door frame 42 and the edges of the flanges 16 of the barrier shield 10 would be placed therein and secured by adhesive and/or nuts and bolts, not shown.

Figure 9:
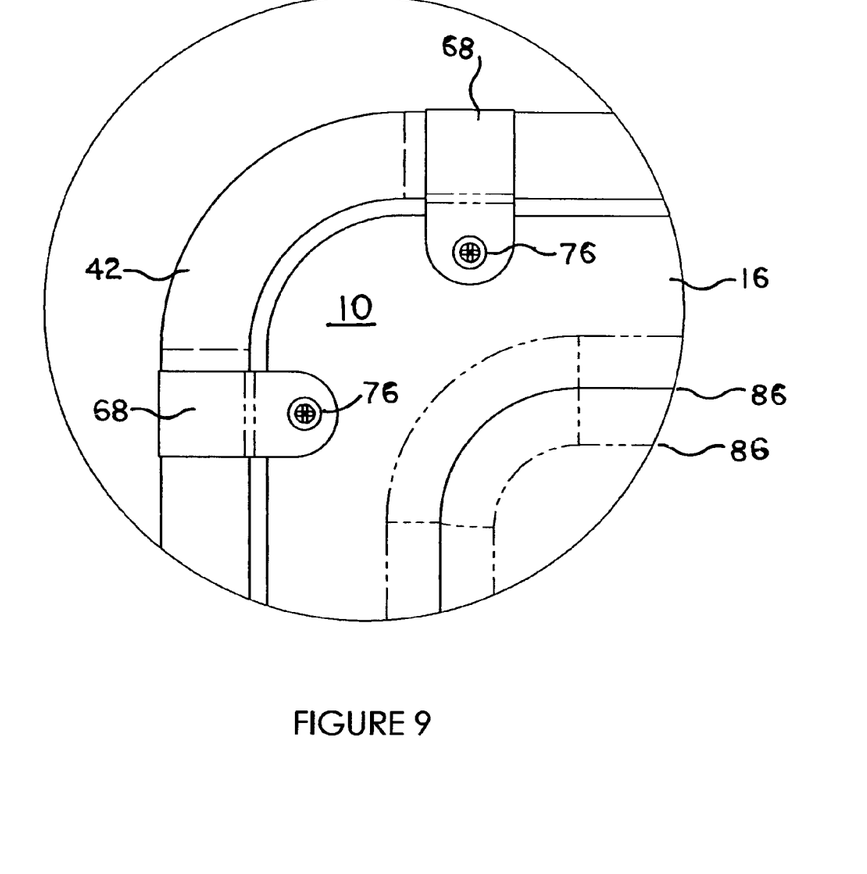
FIG. 9 is a partial front elevational view of one embodiment of securing means for securing the barrier shield in the closure door frame.

As seen in FIG. 9, the barrier shield 10, only partially shown, being on the outer corner of the closure door 12, as noted in FIG. 2 by a view IX, is secured by means of tube clamps 68 to the door frame 42. Bolt holes are drilled in the barrier shield 10 for the placement therein of nut and bolts hardware 76 through the tube clamps 48 and the flange 16. All metal materials in the closure door 12 are preferably stainless steel unless otherwise noted.

As seen in FIG. 2, closure door 12 is mounted by hinges 38 and 40 to a vertical door support 36. The vertical door support 36 is attached to a vertical enclosure support 34 by means of a locking fixture, not shown, or by nut and bolts. The vertical enclosure support 34 provides partial support to the isolation enclosure structure 24, seen only partially in FIG. 2. The isolation enclosure structure 24 surrounds a driver seat 26 on the back side, to the left and right sides. The upper enclosure section 48, is normally composed of a clear, solid formed design, preferably polycarbonate, as opposed to multiple window pieces. It is intended that the barrier shield 10 be made of similar materials as the surround in the upper enclosure section 48. The lower enclosure section 50 being of similar shape as the upper enclosure section 48 is normally composed of a panel of material such as plastic or metal.

A steering wheel 28 is conventionally located in front of the driver seat 26. The bus has a front windshield 30 and a side window 32.

FIG. 2 shows the closure door 12 in the open position and blocking entrance to the driver seat 26 and the related area. This is the position of the door 12 when passengers are entering the bus. The driver would be standing near the door 12 or adjacent to the entry door of the bus, not shown, to check passengers into the bus. After the passengers are loaded, the bus driver will turn the closure door 12 approximately 90 degrees to the left to a closed position as only partially seen in FIG. 8.

Figure 8:
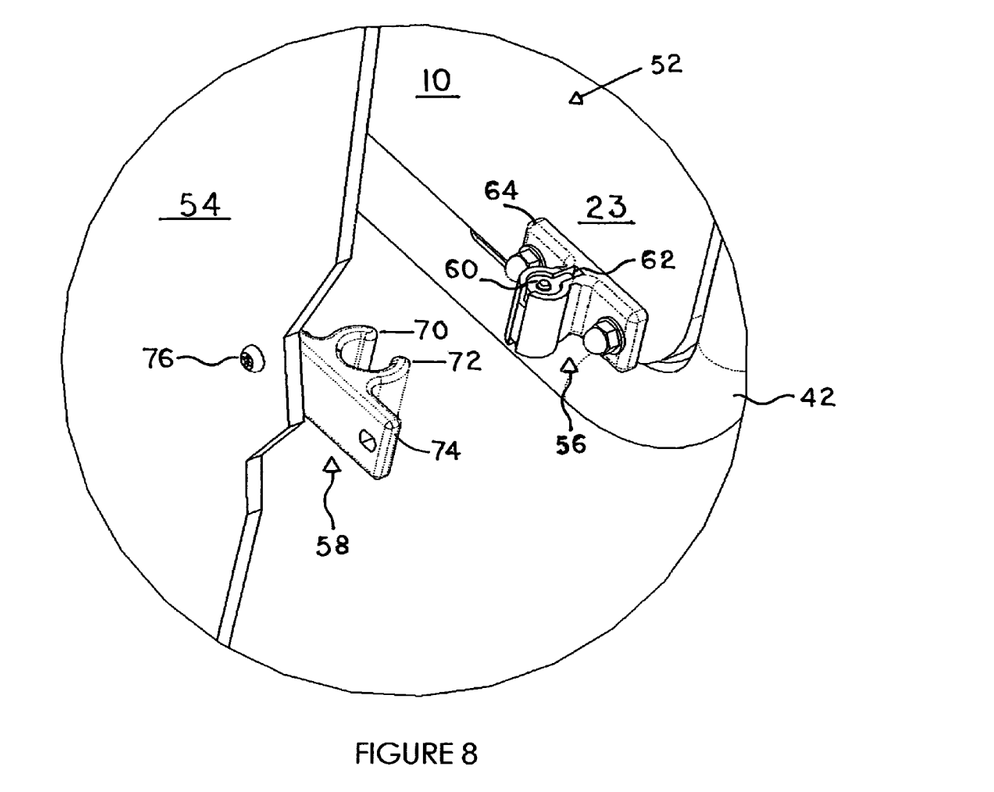
FIG. 8 is a perspective view of the securing means for placing the barrier shield across the isle of the bus in a closed position.

A securing device 52 is further shown in FIG. 8 in greater detail.

Clearly many devices may be used to secure the closure door 12 to an entrance panel 54, also known as, a passenger modesty panel, like with magnets and the following description is merely to show one type of mechanism for attaching the closure door 12 to the entrance panel 54.

In FIG. 8, a male latch device 56 is shown as a cylindrically shaped section 60 with an attaching neck 62 on a base 64. The base 64 may be secured to the barrier shield 10 or door frame 42 by bolts and nuts, for example.

A female latching device 58 is composed of a pair of flexible wings 70 and 72 having inwardly protruding sections attached to a base 74. The cylindrically shaped section 60 when sufficiently urged will enter into and spread apart the wings 70 and 72 and will be held within the wings 70 and 72 by the inwardly protruding sections.

It is therefore seen that the closure door 12 may be opened even by the passengers by pushing against the door 12. This allows safe exit in case of an emergency when the driver is unable to assist due to injury or death or otherwise.

It is therefore necessary that the driver have a very clear view into the passenger area of the bus so as to observe passenger movement. A passenger attempting to reach the driver would have to push open the closure door 12, but this would provide a measure of protection to the driver since the closure door 12 partially blocks access to the driver when in the open position as seen in FIG. 2.

Figure 3:
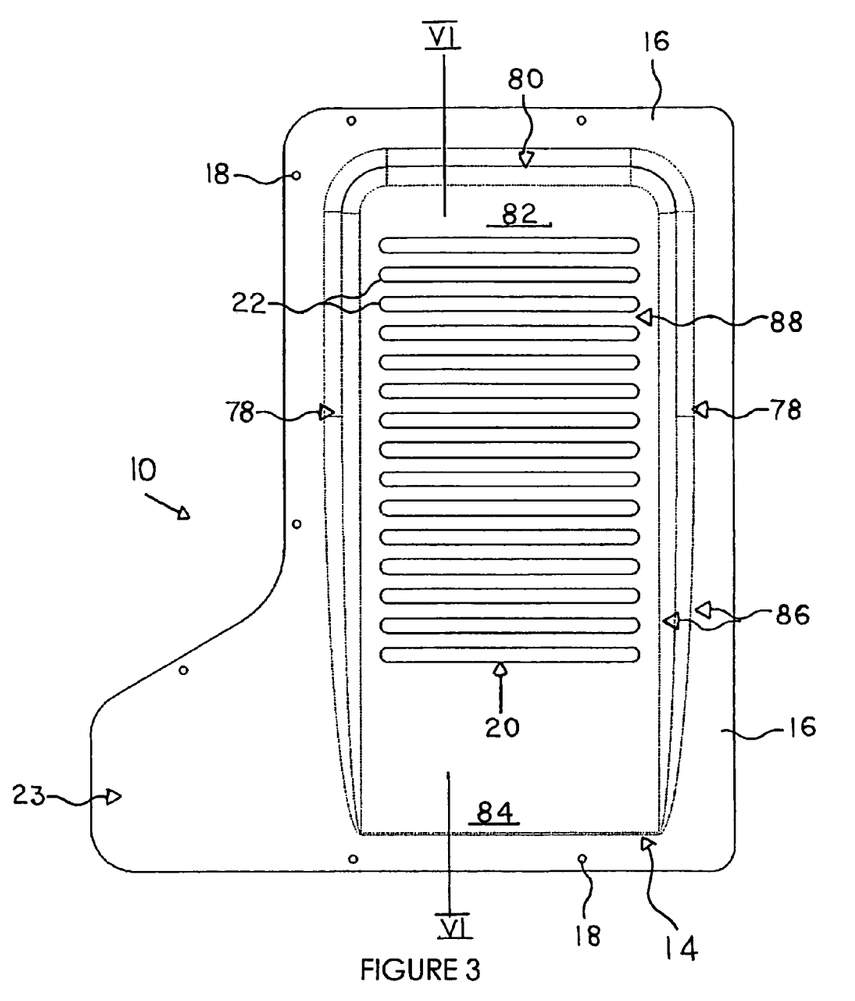
FIG. 3 is a front elevational view of another embodiment of the barrier shield of the present invention having more slots than the barrier shield shown in FIG. 1.

Referring to FIG. 3, the barrier shield 10 is shown by an elevational front view. The dashed lines refer to bend lines in the plastic panel. The solid lines are wall edges. As seen in FIG. 2 and FIG. 3, the flanges 16 about the slanted high visibility insert 14 are used to secure the barrier shield 10 to the door frame 42. Although the flanges 16 may not be used, the means for attaching the slanting high visibility insert 14 becomes more difficult although clearly within the skill of a person in the art. The latch mounting area 23 shown in FIG. 1 is used for the placement thereon of certain items such as the securing device 52. The slanted high visibility insert 14 is attached to the flanges 16 by two triangular shaped walls 78 and a top rectangular wall 80. A slanted back panel 82 of plastic, for example, is attached to the three walls, 78 and 80. The bottom 84 of the back panel 82 is attached to the flange 16 at the bottom. If the insert 14 is an integrally formed piece of plastic, for example, all of the joints between the walls 78 and 80 and the slanted back panel 82, the latch mounting area 23 and the flanges 16 are clear solid plastic. The bend lines 86 are merely placed on the drawings for assistance in understanding the structure of the barrier shield 10.

Figures 6, 6A:
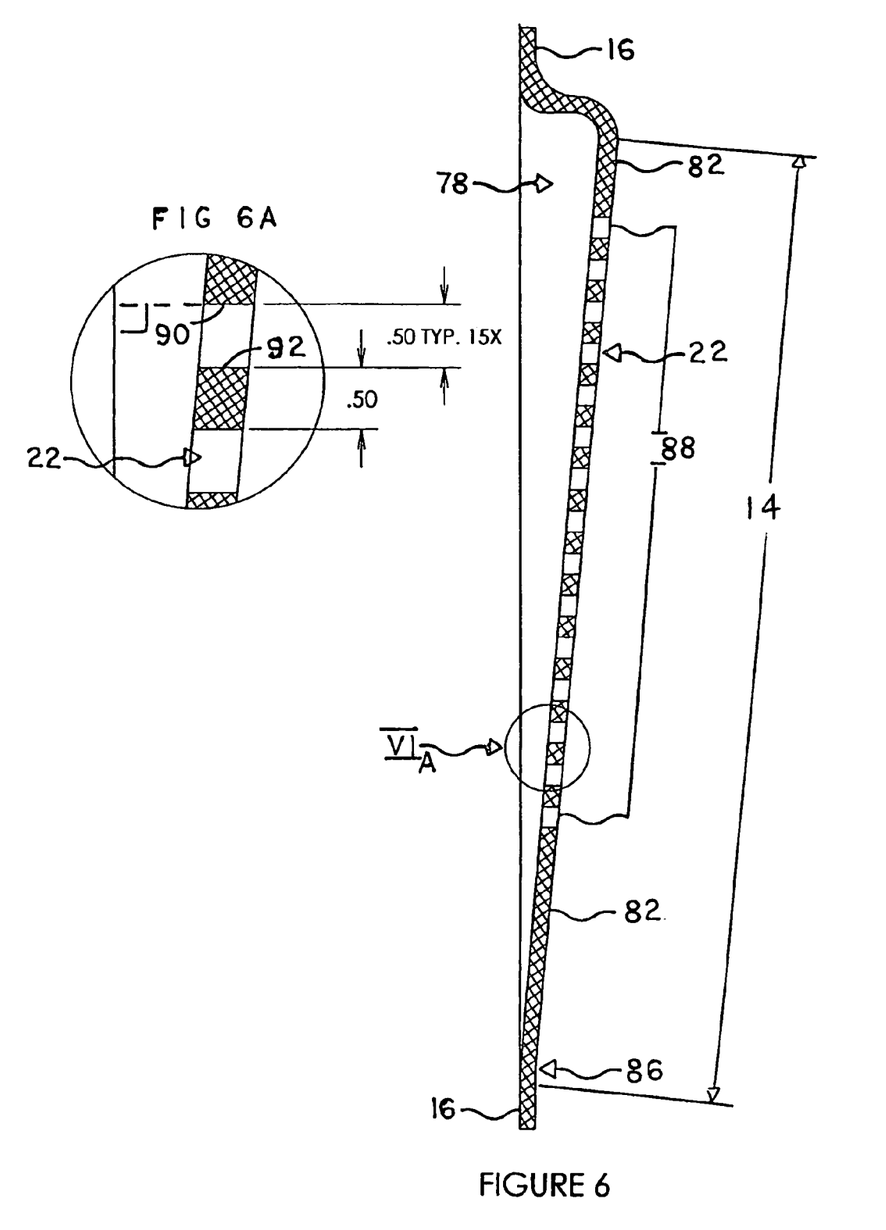
FIG. 6 is a right side cross sectional view of the barrier shield of FIG. 3.
FIG. 6A illustrates in greater detail the slots having an upper and a lower wall perpendicular to the vertical direction of the enclosure door of the present invention.

The horizontal viewing ports 22 forming an apertured area 88 are typically rectangular openings as seen in FIG. 6 in cross section and formed after the molding process and cut out at a later time during manufacturing. The slots 22 may number between 8 and 15 and are typically 0.50 inches high, about 9 inches long, and area approximately 0.375 inches deep through the panel 82. The slots 22 are about 0.50 inches apart. See also FIG. 6A. The slanted back panel 82 and walls are approximately 0.375 inches thick also. The extent of the high visibility insert 14 is indicated by the extension lines on the right side. This is further shown in FIG. 1 where the inner dashed lines 86 closest to the slots 22 or predetermined openings 20 indicate the insert 14. The dashed lines indicate bend lines of the attaching walls 19 of the means for mounting the back panel 82 to the flanges 16. The back panel 82 being the insert 14 and the apertured area 88 in the preferred embodiment as seen in FIG. 1.

In the preferred embodiment, the barrier shield 10 is made of clear polycarbonate material. The width of the panel 82 is approximately 15.5 inches with a height of about 19.0 inches. Overall, the barrier shield 10 is approximately 22.25 inches by 26.0 inches, including the flanges 16 thereon.

It is clear that this embodiment is designed for a particular bus application and therefore may be changed appropriately. For example, the slots may very in size or number, or may be replaced with other openings such as holes or vertical slots, etc.

Figure 4:
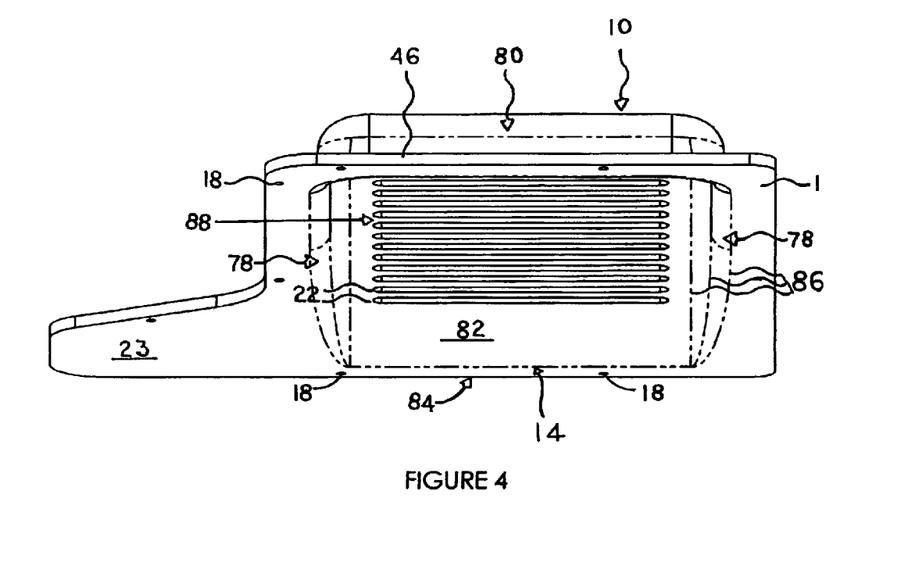
FIG. 4 is a top view of the barrier shield of FIG. 3 tilted backward by about 30 degrees.
Figure 5:
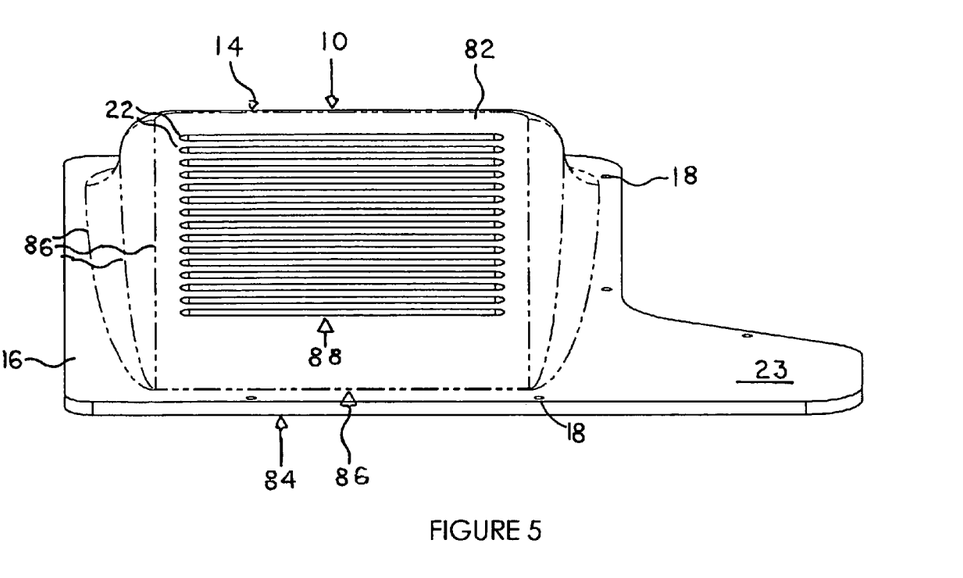
FIG. 5 is a bottom view of the barrier shield of FIG. 4.

FIG. 4 is a top view of the barrier shield 10 as seen in FIG. 3 with the shield 10 tilted backward. Similar items have the same item numbers. The numerous lines in the apertured area 88 indicate edges of the slots 22. FIG. 5 is a bottom view of the barrier shield 10 as seen in FIG. 4. As seen in FIG. 4, a top edge 46 of the flange 16 is shown. Dashed lines indicate bend lines in the plastic material. As seen in FIG. 4 and FIG. 5, the maximum depth of the slant is approximately 2 inches over a distance of 19.0 inches, i.e., an angle of approximately 6.3 degree from the vertical direction.

FIG. 6 is a right side cross sectional view vertically through the barrier shield 10 of FIG. 3 taken along line VI—VI. The sides 90 and 92 of the slots 22 are cut horizontally and perpendicular to the vertical direction of the apertured area 88 to maximize the viewing area, as shown in FIG. 6A which is an enlarged view of the area indicated in FIG. 6. One of the triangular walls 78 is clearly seen in FIG. 6 and is on the right side of the shield 10 in FIG. 3. The cutting of the sides 90 and 92 of the slots 22 may be adjusted to maximize the openings as seen by an average sized seated bus driver when looking into the inside rear-view mirror.

Figure 7:
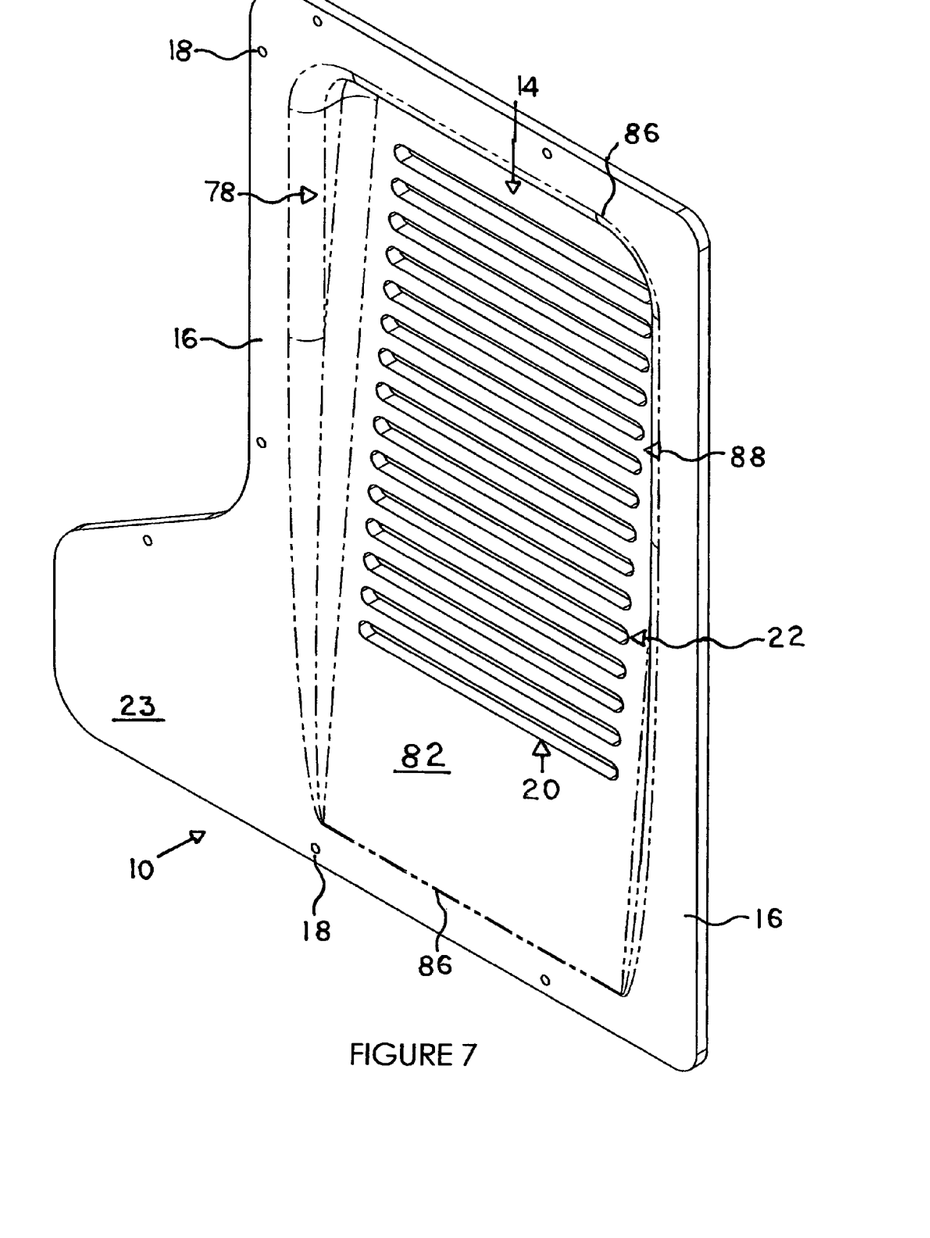
FIG. 7 is a front side perspective view of the barrier shield of FIG. 3.

FIG. 7 is an isometric perspective view from the front side of the barrier shield 10 of FIG. 3 which clearly shows the slanted high visibility insert 14 as it is slanted away from the flange area 16 that is used to mount the barrier shield 10 to the door frame 42. It is possible that the walls 78 and 80 may be directly connected to the door frame 42, but this embodiment is not further shown. FIG. 7 clearly shows the outstanding features of the unitary construction of the barrier shield 10 from a single piece of molded plastic.

In order to minimize manufacturing costs, the slant and the walls may be omitted and thus the back panel 82, as a flat piece with slots, may be directly connected to the vertical door insert by itself. This clearly reduces the anti-glare and anti-reflection features of the barrier shield 10.

Clearly, many modifications and variations of the present invention are possible in light of the above teachings and it is therefore understood that within the inventive concept that the invention may be practiced otherwise than specifically claimed.

What is claimed is:

1. A barrier shield for use in multiple passenger vehicles like buses, the barrier shield being installed in closure door, said barrier shield comprising:
   an apertured area, said apertured area having one or more predetermined openings therein for increased visibility;
   a high visibility insert, said high visibility insert having said apertured area located therein, a slant of said high visibility insert being relative to a vertical direction of said closure door and being at a predetermined angle to maximize visibility through said insert by a driver of a bus, said high visibility insert being composed of a transparent material;
   a back panel, said back panel being composed of a substantially flat transparent material and having said apertured area and said high visibility insert therein; and
   means for mounting said back panel to a frame of said closure door, said barrier shield being a unitary piece of plastic material.

2. A barrier shield as defined in claim 1, wherein said means for mounting further includes a plurality of side walls for supporting said back panel in said barrier shield, said side walls having varying heights, said side walls being connected to said back panel so that said high visibility insert is slanted from a vertical direction.

3. A barrier shield as defined in claim 2, wherein said means for mounting further includes flanges mounted to said side walls and said back panel for connecting to a closure door frame.

4. A barrier shield as defined in claim 3 wherein said barrier shield is composed of polycarbonate material being molded in a predetermined shape.

5. A barrier shield as defined in claim 1 wherein the high visibility insert is composed of transparent material.

6. A barrier shield as defined in claim 5 wherein the transparent material is plastic.

7. A barrier shield as defined in claim 6 wherein the plastic is polycarbonate.

8. A barrier shield as defined in claim 2 wherein the slant is preferably about 6 degrees.

9. A barrier shield as defined in claim 1 wherein the predetermined openings comprise a plurality of slots.

10. A barrier shield as defined in claim 9 wherein the slots are horizontal.

11. A barrier shield as defined in claim 10 wherein the slots number in the range from 5 to 15 and have an opening height of approximately 0.5 inches.

12. A barrier shield as defined in claim 1 wherein the barrier shield is integrally formed of thermoforming plastic.

13. A barrier shield as defined in claim 12 wherein the barrier shield further includes mounting flanges which are integrally formed of a transparent material.

14. A barrier shield as defined in claim 13 wherein the transparent material is plastic.

15. A barrier shield as defined in claim 14 wherein the plastic is polycarbonate.

16. A method of reducing glare and reflections from a barrier shield, said method comprising the steps of:
    providing an apertured area, said apertured area having one or more predetermined openings therein for increased visibility;
    providing a slanted high visibility insert, said slanted high visibility insert having said apertured area therein, said slanted high visibility insert being relative to a vertical direction of a closure door; and
    providing a means for mounting the slanted high visibility insert in a door frame of a bus in close proximity to a driver's seat, the door frame being able to block the aisle near the driver's seat, wherein said apertured area, said slanted high visibility insert and said means for mounting form a unitary shield.

17. A method as defined in claim 16 wherein the insert is made of a transparent material.

18. A method as defined in claim 17 wherein the insert is made of polycarbonate material.

19. A method as defined in claim 16 wherein the angle of the slant of the high visibility insert is determined by maximizing visibility through the insert by a person looking through the insert by means of an inside rear-view mirror.

20. A method as defined in claim 19 where the angle of the slant is about six degrees from a vertical direction.

21. A method as defined in claim 16 wherein the high visibility openings are a plurality of substantially rectangular openings therethrough.

22. A method as defined in claim 16 wherein said means for mounting includes side walls being attached to a panel of said shield and to mounting flanges thereon.

23. A method as defined in claim 22 wherein the insert, side walls and mounting flanges are integrally formed during a molding process to form a unitary barrier shield for mounting in a door frame of a bus.

24. A method as defined in claim 22 wherein the barrier shield is mounted in a door frame of a closure door, the closure door being mounted in the proximity of the driver of a bus, said closure door being able to block the aisle in the bus.

* * * * *